March 3, 1936.  O. S. HERSHEY  2,032,802
AUTOMOBILE LOCK
Filed June 1, 1925  2 Sheets-Sheet 1
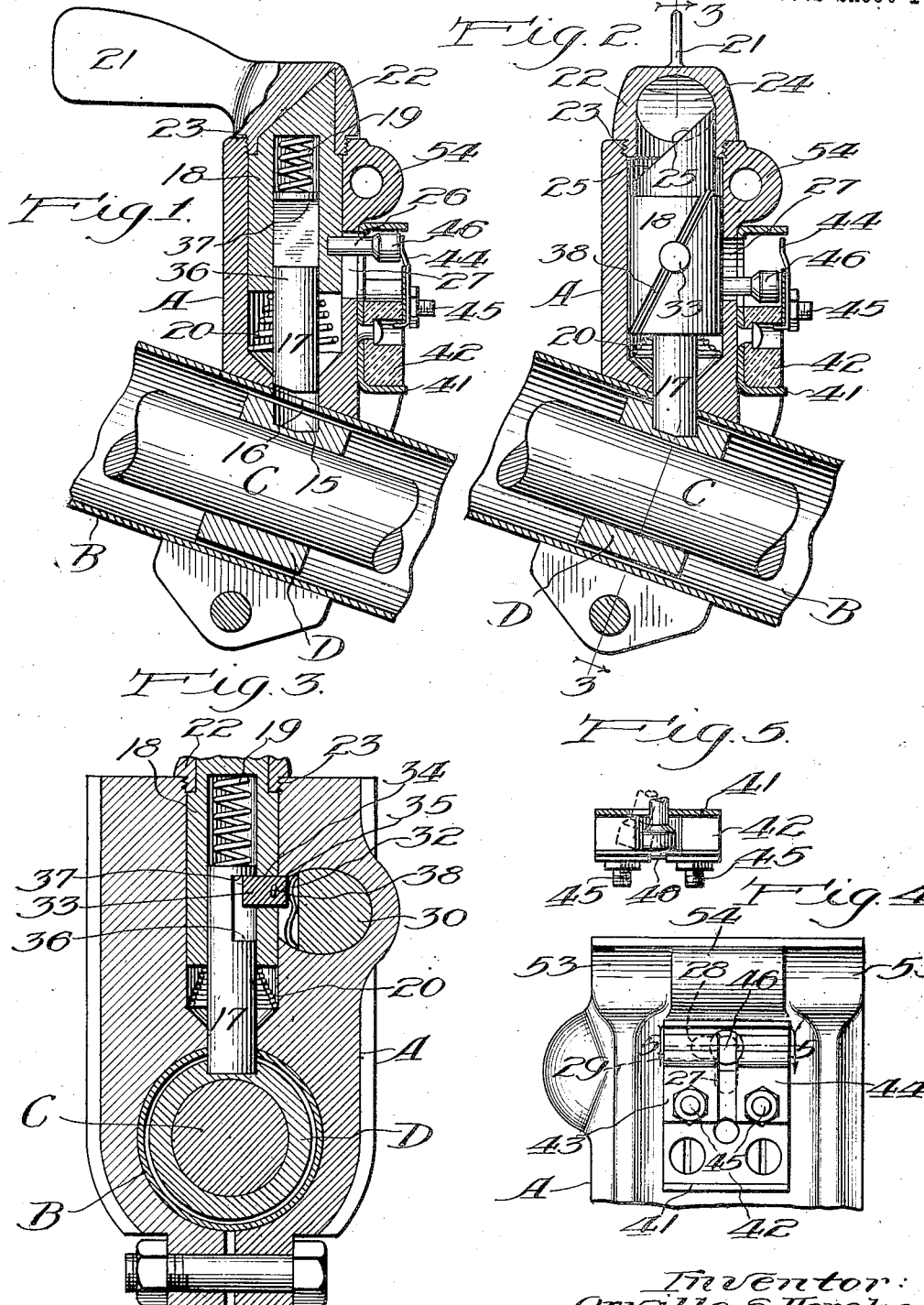
Inventor:
Orville S. Hershey.

March 3, 1936.  O. S. HERSHEY  2,032,802
AUTOMOBILE LOCK
Filed June 1, 1925  2 Sheets-Sheet 2

Inventor:
Orville S. Hershey,

Patented Mar. 3, 1936

2,032,802

UNITED STATES PATENT OFFICE 2,032,802

AUTOMOBILE LOCK

Orville S. Hershey, Chicago, Ill., assignor, by mesne assignments, to Oakes Products Corporation, North Chicago, Ill., a corporation of Michigan Application June 1, 1925, Serial No. 33,884

18 Claims. (Cl. 70—127)

This invention relates to a lock adapted especially for automobiles and is designed more particularly for association with one of the operating units thereof. It may be connected with a steering mechanism, a change speed mechanism, a motor ignition circuit, or any other unit or system whose operation is required in the use of the vehicle.

The embodiment of my invention herein shown and described includes a switch which may be interposed in the motor ignition circuit. Such a switch is designed to be opened, thereby disabling the motor, whenever the lock is operated to interfere with the use of an associated mechanism. It is desirable that special provision be made for opening the circuit independently of the lock, if and when an emergency arises. The present lock is accordingly equipped with means for accomplishing this result.

In my Patent No. 1,442,765 granted January 16, 1923, I have disclosed a lock and an interconnected switch having a single control means adapted, when actuated, to be moved into two positions. In the first the switch alone is operated, whereas the lock is not moved until the control means passed from the first into a second position. In the present invention, similar results are obtained by the use of a single control means which may be rocked in either of two ways. When rotated in the direction which will be termed "normal", both the switch and lock are operated conjointly, but if the control be rotated in the opposite or abnormal direction, the switch alone is opened. By incorporating into a lock structure a control means of the kind described, it is possible to stop the motor without disabling any of the remaining units with which the lock may be associated. My invention is accordingly concerned with the provision of a lock having the characteristics noted, and with various other objects and purposes which will hereinafter appear.

The exemplification of my invention shown in the accompanying drawings is such as may be associated with an automobile steering mechanism. It is designed for attachment to a fixed part of the vehicle, such as the instrument board, and to the column through which the steering post is extended. The lock structure accordingly serves as a bracket for supporting the column to the board. Inasmuch as the angular relation of the column to the instrument board differs greatly in automobiles of different manufacture, I have associated with the lock housing an adjustable bracket plate which may accommodate itself to instrument boards whose angular relation to the column varies within considerable limits. The connection thus provided between the bracket plate and the lock housing is simple, inexpensive and readily assembled, and constitutes one of the objects of my invention. I have further devised certain improvements in the assembly of the lock parts by which notable economies are effected in production and assembly costs, and these also are included among the objects of my invention:

In the drawings:

Figure 1 which is a sectional view through a steering column and associated lock, shows the locking bolt as retracted;

Fig. 2 is a similar view except that the plunger is shown in elevation with all the parts advanced to locking position;

Fig. 3 is a sectional view taken on line 3—3 of Fig. 2;

Fig. 4 is a fragmentary elevation of the rear side of the lock housing showing the switch mounted thereon;

Fig. 5 is a detail in section taken through the switch on line 5—5 of Fig. 4;

Figure 6:
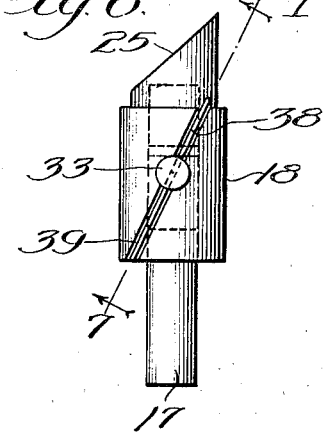
Fig. 6 is a view in elevation of the plunger and locking bolt assembly.
Figure 7:
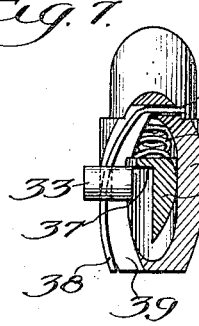
Fig. 7 is a sectional view taken on line 7—7 of Fig. 6.
Figure 8:
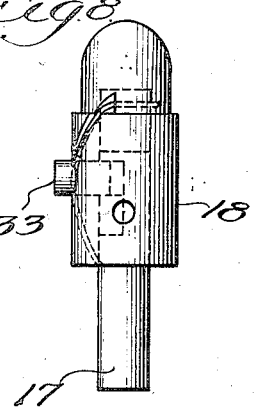
Fig. 8 shows a plunger and locking bolt assembly in elevation, as viewed from the right side of Fig. 6.
Figure 9:
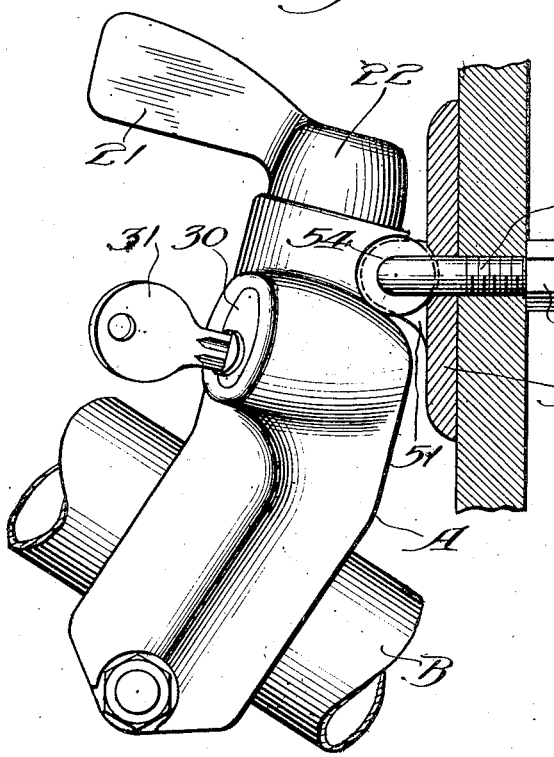
Fig. 9 is a view in cross section through an instrument board with adjustable bracket plate thereon, showing in elevation its connection with a lock housing of the kind elsewhere illustrated in the drawings.
Figure 10:
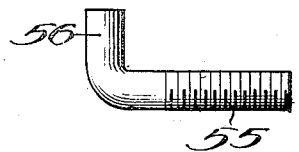
Fig. 10 is a view in elevation of one of the pivot bolts forming the connection between the lock housing and the bracket plate.
Figure 11:
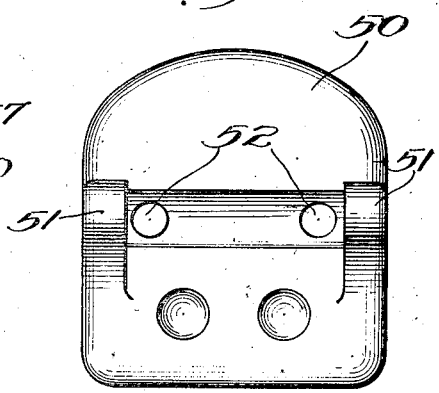
Fig. 11 is a view in elevation of the front side of the bracket plate per se.

The present lock may be contained within a housing A through which is an opening for accommodating the column B within which is extended a post C connecting the steering wheel with the swiveled running wheels, usually at the front of an automobile. Secured fast to the post is a collar D having therein a groove or socket 15 which may be brought into register with an opening 16 formed in the column. The locking mechanism herein shown includes a bolt 17 adapted to be projected through the opening 16 into the socket 15 so as to lock the steering post against rotation. As part of the bolt assembly I have shown a hollow plunger 18 wherein is accommodated a compression spring 19 which tends to project the bolt into locking position. A second spring 20 exerts an opposite force on the plunger such as to retract the same whenever conditions will permit.

Associated with the plunger is a control means for the locking bolt. As shown, this comprises a lever or handle 21 which is extended laterally from a hub 22 having a screw threaded connection as at 23 with the housing walls. Interiorly of the hub is a chamber having a cam wall 24 in co-operative relation to a second cam wall 25 which is formed on the outer end of the plunger. In response to rotary movement of the handle 21 the plunger is forced inwardly, so as to advance the locking bolt to effective position. In order that the plunger may normally be held against rotation, I have provided a post 26 which extends laterally therefrom through a slot 27 formed in a housing wall. As appears best in Fig. 4, the rear end of this slot is enlarged at 28, so as to provide a transverse wall 29. By the provision of some such slot, within which the post 26 is extended, the plunger is restricted to reciprocal movements when the control means is rotated in one direction, and is permitted to rotate slightly, but without any advance, when the control means is rotated in the opposite direction. Due to the action of the spring 20, and the two cams 24 and 25, the control means is normally caused to stand in a central position such that it may be rocked to either side, according to the manipulation desired.

The movements of the locking bolt are governed by a lock comprising a cylinder 30 adapted for operation by a removable key 31. At the rear end of the cylinder is an eccentric or cam device 32 adapted to engage with the proximate end of a pin 33 which is slidably mounted within an aperture 34 formed laterally through the plunger walls and also through a communicating aperture 35 which connects with the two passages wherein the plunger and cylinder lock are disposed. With the parts related as in Fig. 3, the pin lies in both apertures so as to hold the plunger in advanced position. Its inner end is receivable within a recess in the locking bolt formed by a flat having inner and outer end walls 36 and 37 respectively. The distance through which the bolt may be moved relative to its associated plunger is determined by a length of this flat and the consequent engagement of one or the other of its end walls with the pin 33. The pin which serves as a lock for the plunger accordingly acts also as a stop for the bolt. The normal position of the pin is outward, or away from the bolt, this being effected by a wire spring 38 which passes through the pin. The wire is receivable within a groove 39 which extends generally longitudinally of the plunger, and preferably slantwise thereof, as best shown in Fig. 6. One wire end 40 is inwardly bent for anchorage within a laterally extending bore of the plunger.

Movement of the pin to an inner position where it is clear of the aperture 35 can only be brought about when rotation of the cylinder 30 takes place. The moment that the pin reaches this inward position, the plunger may retract in response to tension of the spring 20 with the consequence that the pin 33 is confined to its inner position. It is only when the plunger is again advanced to the position of Fig. 3 by proper manipulation of the control means that the pin is free to spring out again, the result being that the locking bolt is then held indefinitely in its forward position.

The post 26, besides guiding the movements of the plunger, serves also as one element of a switch which may desirably be interposed in the motor ignition circuit. As shown, the switch consists of a frame 41 in which is carried an insulating block 42 for the mounting of a pair of spaced brushes 43 and 44, each having an unsupported end projected beyond the block and inwardly inclined toward the plunger. Suitable elements 45 are provided for attachment of the circuit wires. On the post 26 is carried a head 46 adapted to make contact with the innermost ends of the two brushes when the plunger is in the normal position of Fig. 1. With movement of the post lengthwise of the slot 27, its head 46 is moved away from the inwardly projecting ends of the brushes so as to break contact therewith. The circuit may also be broken without advance of the plunger if the control be moved abnormally, the result being that the plunger is rotated to shift the plunger laterally to break contact with the brush 44, as best indicated in Fig. 5. It follows, therefore, that the control means for the present lock may be rotated in either of two directions (1) to open the circuit alone or (2) to conjointly open the switch and advance the locking bolt. In using the terms "open" and "closed" with reference to the motor ignition circuit, I have in mind the system of ignition most generally employed, but knowing that magneto-equipped motors may be operated on an open circuit, which is the reverse of the prevailing kind, I would have these terms properly interpreted to describe the true situation.

The means by which the present lock housing may be connected to a fixed part of the automobile, such as its dash or instrument board, may desirably include a bracket plate 50 having spaced companion ears 51 adjacent each of which is an opening 52. Such a plate is designed for attachment to the dash or instrument board by means which will presently be explained. Its two ears which are forwardly projected are adapted to lie within a pair of sockets 53 which are provided on the under side of the housing, preferably near the upper end thereof. Between these sockets is positioned a sleeve 54 which preferably is formed integral with the housing. When the bracket plate is positioned operatively to the housing, a space intervenes between each ear and the proximate end of the sleeve sufficient to expose each opening 52. Through these openings are inserted bolts 55 each having a pivot end 56 turned laterally to lie within the proximate end of the sleeve. The two bolts extend rearwardly through the instrument or dash board to receive on the under side thereof nuts 57 which complete the connection.

By the means described, the lock housing is held adjustably upon the bracket plate through the medium of the two pivot bolts 55, which permit it to swing through an arc of appreciable magnitude, thus adapting the housing to accommodate itself to the inclination of the steering column with which it is associated. The advantages of the bracket connection just described reside largely in low manufacturing costs, ease of assembly, and neatness in appearance.

The various details of construction as hereinbefore set forth are manifestly susceptible of embodiment in forms other than the precise one shown, and any such modifications, insofar as they fall within the purview of the claims below, are to be considered as embraced within the limits of my invention.

I claim:

1. In an automobile having a motor ignition circuit with an interposed switch, a lock in which is included a bolt, means connecting the bolt and switch in a manner whereby the switch is operated in response to movements of the bolt, and a single control means therefor movable rotatably in opposite directions from a normal position of rest, said control means serving to operate the switch alone when rotated in one direction, and to operate the switch and bolt conjointly when rotated in the other direction, substantially as described.

2. In an automobile having a motor ignition circuit with an interposed switch, a lock in which is included a bolt, means connecting the bolt and switch in a manner whereby the switch is operated in response to movements of the bolt, a rotatable operating handle, a cam connection between the handle and bolt adapted to transform rotary movements of the handle into longitudinal movements of the bolt, spring means working through the bolt to hold the handle in a normal position of rest, means for confining the bolt movements to a straight line when the handle is rotated in one direction, and for permitting limited rotary movement of the bolt without advance when the handle is rotated in the opposite direction, and a connection between the bolt and the switch serving to open the switch with either of said movements, substantially as described.

3. In an automobile having a motor ignition circuit in which is interposed a switch, a locking bolt, a rotatable control means for the bolt, a spring working through the bolt to hold the control means in a normal position of rest, means for guiding the movements of the bolt in a manner whereby it is permitted to advance when the control means is rotated in one direction and to turn without advancing when the control means is rotated in the opposite direction, and a connection from the bolt to the switch such that the latter is operated when the bolt executes either of said movements, substantially as described.

4. In an automobile having a motor ignition circuit with an interposed switch, a locking bolt, a rotatable control means therefor adapted to move the bolt, means by which the control means is held in a normal position of rest from which it may be turned in either direction, means acting upon the bolt for confining its movements to a straight line when the control means is rotated in one direction and for permitting rotation without advance of the bolt when the control means is rotated in the opposite direction, and a connection from the bolt to the switch such that the latter is operated with either movement of the bolt, substantially as described.

5. An automobile lock in which is comprised a hollow plunger, a bolt slidable within the plunger, a spring tending to eject the bolt from the plunger, and stop means for the bolt comprising a pin which is movable transversely through the plunger to engage within a longitudinal slot in the bolt, and a spring traversing the pin and disposed within a groove formed in the plunger, substantially as described.

6. In an automobile lock, the combination of a bolt, a hollow plunger in which the bolt is slidable, spring means within the plunger tending to eject the bolt therefrom, there being a longitudinal slot formed in the bolt and a lateral opening through the plunger, a pin slidable within said opening to present its inner end within the bolt slot, whereby the pin serves as a stop to prevent disassembly of the bolt from the plunger, and a spring carried by the plunger and co-acting with the pin to slide the same in one direction, substantially as described.

7. An automobile lock in which is comprised a bolt, a hollow plunger within which the bolt is slidable, spring means tending to project the bolt from the plunger, a pin movable transversely through an opening in the plunger to engage with a slot in the bolt whereby to prevent removal of the latter from the plunger, and a spring carried by the plunger and engaged with the pin in a manner to hold the latter from engagement with the bolt, the spring being in the form of a wire which is disposed within a groove formed longitudinally and slantwise of the plunger, substantially as described.

8. In an automobile lock, the combination of a bolt, a plunger in which the bolt is slidably carried, spring means tending to eject the bolt from the plunger, a pin movable transversely through an opening in the plunger and engageable with the bolt to prevent its disassembly from the plunger, spring means tending normally to disengage the pin from the bolt, and a rotatable key controlled lock having an eccentric co-operating with the pin to move the latter in opposition to the spring means last mentioned, substantially as described.

9. In an automobile lock, a bolt, a plunger in which the bolt is slidable, a spring which tends to eject the bolt from the plunger, a mounting in which the plunger is slidably held, a second spring tending to retract the plunger from its mounting, and a control means for the plunger having a cam face, the control means being rotatable about an axis which is coincident with that of the plunger, the plunger being formed also with a co-operating cam face such that rotation of the control means will be transformed into a translatory movement of the plunger, substantially as described.

10. In combination with an automobile steering column and dash board, a lock housing connected to the column, a bracket plate upon the dash board having a pair of openings, two ears extending from the plate, there being sockets in the lock wherein the ears may lie, an apertured sleeve carried by the lock between the two ears, and a pair of bolts extended through the dash board and two openings in the plate, each bolt having one end laterally bent for insertion within the sleeve whereby the bolt ends provide a pivotal mounting for connecting the housing to the plate, substantially as described.

11. In an automobile having a dash board and a steering column, a lock housing connected with the column, a bracket plate mounted upon the dash board, and means pivotally connecting the plate to the housing comprising a pair of bolts extending through the dash board and plate, each bolt having one end turned laterally toward the other, there being an opening in the housing wherein the bent end of the bolt may lie to pivotally connect therewith.

12. In an automobile having a steering column and a dash board, a lock housing connected with the column, a plate arranged upon the dash board, and means connecting the housing pivotally to the plate comprising mutually engaging elements on these parts, a sleeve made fast to the housing, and two bolts extended through the dash board and plate, each bolt having one end turned laterally toward the other to enter the sleeve whereby to provide a pivotal connection therewith, substantially as described.

13. In an automobile having a steering column and a dash board, a lock housing connected with the column, a bracket plate arranged upon the dash board, and a pivotal connection between the plate and housing comprising co-operative bearing elements extended from the one to the other, a sleeve on the under side of the housing between said bearing elements, and a pair of bolts extended through the dash board and plate to the inside of said bearing elements, each bolt having one end inturned toward the other to enter the sleeve whereby to form a pivotal connection therewith, substantially as described.

14. In an automobile having an electrical circuit with an interposed switch, a locking bolt, means connecting the bolt and switch in a manner whereby one is operated in response to movements of the other, and a single control means associated with one of these parts and movable rotatably in opposite directions from a normal position of rest, said control means serving to operate the switch alone when rotated in one direction, and to operate the switch and bolt conjointly when rotated in the other direction, substantially as described.

15. In an automobile having an electrical circuit with an interposed switch, a locking bolt, means connecting the bolt and switch in a manner whereby one is operated in response to movements of the other, and a single control means associated with one of these parts and movable through an arc, the arrangement being such that movement of said control means through one portion of the arc operates the switch only and movement thereof through another portion of the arc operates the bolt.

16. In an automobile having an electrical circuit with an interposed switch, a locking bolt, means connecting the bolt and switch in a manner whereby one is operated in response to movements of the other, and a single control means associated with one of these parts and movable through an arc, the arrangement being such that movement of said control means through one portion of the arc operates the switch only and movement thereof through another portion of the arc operates both the switch and the bolt.

17. In an automobile having an electrical circuit with an interposed switch, a locking bolt, means connecting the bolt and switch in a manner whereby one is operated in response to movements of the other, and a single control means associated with one of these parts and movable through an arc, the arrangement being such that movement of said control means through one portion of the arc operates the switch only and movement thereof through another portion of the arc moves the bolt longitudinally.

18. In an automobile having an electrical circuit with an interposed switch, an axially shiftable locking bolt, a common control lever for said switch and bolt, and means whereby swing of said lever through one portion of its arc of movement will shift the bolt and movement thereof through another portion of its arc of movement will open and close the switch.

ORVILLE S. HERSHEY.